(12) United States Patent
Litwin

(10) Patent No.: US 7,054,940 B2
(45) Date of Patent: May 30, 2006

(54) ADAPTIVE COST OF SERVICE FOR COMMUNICATION NETWORK BASED ON LEVEL OF NETWORK CONGESTION

(75) Inventor: Louis Robert Litwin, Plainsboro, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 789 days.

(21) Appl. No.: 10/057,008

(22) Filed: Jan. 25, 2002

(65) Prior Publication Data

US 2003/0145098 A1    Jul. 31, 2003

(51) Int. Cl.

| | |
|---|---|
| G06F 15/16 | (2006.01) |
| G06F 11/00 | (2006.01) |
| H04J 1/16 | (2006.01) |
| H04J 3/14 | (2006.01) |
| H04L 12/28 | (2006.01) |
| H04L 12/56 | (2006.01) |
| G06F 15/173 | (2006.01) |
| G01R 31/08 | (2006.01) |
| G08C 15/00 | (2006.01) |
| H04L 1/00 | (2006.01) |
| H04L 12/26 | (2006.01) |
| H04M 15/00 | (2006.01) |

(52) U.S. Cl. ............... 709/227; 709/223; 709/224; 709/235; 370/232; 370/238; 370/395.21; 379/114.02; 379/114.06; 379/114.08

(58) Field of Classification Search ........ 709/223–226, 709/229–235, 241, 227; 370/229–238, 319–321, 370/395.2, 395.21, 395.4–42; 379/114.02, 379/114.06–8; 455/512

See application file for complete search history.

(56) References Cited

U.S. PATENT DOCUMENTS

| | | | | |
|---|---|---|---|---|
| 5,701,294 A | * | 12/1997 | Ward et al. | 370/252 |
| 5,898,668 A | * | 4/1999 | Shaffer | 370/230 |
| 5,936,940 A | * | 8/1999 | Marin et al. | 370/232 |
| 5,956,322 A | * | 9/1999 | Charny | 370/236.1 |
| 5,961,602 A | * | 10/1999 | Thompson et al. | 709/229 |

(Continued)

FOREIGN PATENT DOCUMENTS

EP    1045546    10/2000

OTHER PUBLICATIONS

Crawley, E. et al. "A Framework for QoS-based Routing in the Internet," RFC 2386, Aug. 1998.*

(Continued)

*Primary Examiner*—Jason Cardone
*Assistant Examiner*—Melvin H. Pollack
(74) *Attorney, Agent, or Firm*—Joseph J. Laks; Robert B. Levy; Joseph J. Kolodka

(57) ABSTRACT

There is provided a method for providing content to network devices in a communication network. A level of congestion of the communication network is determined (305). A cost of service is calculated based on the level of congestion (310). The network devices are informed of the cost of service (315). A first selection is received from a user of a network device specifying a content to be downloaded to the network device during a download process (320). A second selection is received from the user specifying a cost of service threshold for the download process (325). The cost of service is automatically compared to the cost of service threshold (330). The download process is automatically performed, when the cost of service is less than the cost of service threshold (335).

43 Claims, 5 Drawing Sheets

U.S. PATENT DOCUMENTS

| | | | |
|---|---|---|---|
| 6,011,838 A * | 1/2000 | Cox | 379/112.06 |
| 6,195,543 B1 * | 2/2001 | Granberg | 455/407 |
| 6,215,768 B1 * | 4/2001 | Kim | 370/230 |
| 6,240,462 B1 * | 5/2001 | Agraharam et al. | 709/238 |
| 6,295,294 B1 * | 9/2001 | Odlyzko | 370/389 |
| 6,345,038 B1 * | 2/2002 | Selinger | 370/230 |
| 6,377,548 B1 * | 4/2002 | Chuah | 370/233 |
| 6,388,992 B1 * | 5/2002 | Aubert et al. | 370/232 |
| 6,404,822 B1 * | 6/2002 | Ben-Michael et al. | 375/296 |
| 6,449,350 B1 * | 9/2002 | Cox | 379/134 |
| H2051 H * | 11/2002 | Zhu et al. | 370/395.21 |
| 6,507,563 B1 * | 1/2003 | Glick | 370/236 |
| 6,516,350 B1 * | 2/2003 | Lumelsky et al. | 709/226 |
| 6,542,465 B1 * | 4/2003 | Wang | 370/232 |
| 6,553,515 B1 * | 4/2003 | Gross et al. | 714/47 |
| 6,594,277 B1 * | 7/2003 | Chiang et al. | 370/465 |
| 6,683,853 B1 * | 1/2004 | Kannas et al. | 370/237 |
| 6,731,613 B1 * | 5/2004 | Provance | 370/311 |
| 6,748,222 B1 * | 6/2004 | Hashem et al. | 455/453 |
| 6,778,496 B1 * | 8/2004 | Meempat et al. | 370/230 |
| 6,798,786 B1 * | 9/2004 | Lo et al. | 370/468 |
| 6,801,499 B1 * | 10/2004 | Anandakumar et al. | 370/229 |
| 6,804,520 B1 * | 10/2004 | Johansson et al. | 455/450 |
| 6,829,649 B1 * | 12/2004 | Shorey et al. | 709/235 |
| 6,839,767 B1 * | 1/2005 | Davies et al. | 709/232 |
| 6,839,808 B1 * | 1/2005 | Gruner et al. | 711/130 |
| 6,850,965 B1 * | 2/2005 | Allen | 709/203 |
| 6,854,012 B1 * | 2/2005 | Taylor | 709/224 |
| 6,876,627 B1 * | 4/2005 | Rao | 370/230 |
| 6,961,340 B1 * | 11/2005 | Karlsson et al. | 370/395.6 |
| 6,961,539 B1 * | 11/2005 | Schweinhart et al. | 455/12.1 |
| 2002/0029274 A1 * | 3/2002 | Allen | 709/226 |
| 2002/0080444 A1 * | 6/2002 | Phillips et al. | 359/125 |
| 2003/0035371 A1 * | 2/2003 | Reed et al. | 370/230 |
| 2003/0123393 A1 * | 7/2003 | Feuerstraeter et al. | 370/235 |
| 2005/0021806 A1 * | 1/2005 | Richardson et al. | 709/231 |

OTHER PUBLICATIONS

Wroclawski, J. "The Use of RSVP with IETF Integrated Services," RFC 2210, Sep. 1997.*
Shenker, S., et al. "Specification of Guaranteed Quality of Service," RFC 2212, Sep. 1997.*
Bernet, Y, et al. "A Framework for Integrated Services Operation over Diffserv Networks," RFC 2998, Nov. 2000.*
Hiller, T. et al. "CDMA2000 Wireless Data Requirements for AAA," RFC 3141, Jun. 2001.*
Mitzel, D. "Overview of 2000 IAB Wireless Internetworking Workshoop," RFC 3002, Dec. 2000.*
(PCT Search Report dated Mar. 26, 2003 attached).
Yuksel, M. and Kalyanaraman, S., "Effect of Pricing Intervals on the Congestion-Sensitive of Network Service Prices", IEEE Infocom 2001, pp. 1-9, especially pp. 1-2.
Schnizlein, J., "Internet Economics Perspective on Accounting & Billing", Cisco System Middleware Workshop, Dec. 1998, Entire Document.

* cited by examiner

ADAPTIVE COST OF SERVICE FOR COMMUNICATION NETWORK BASED ON LEVEL OF NETWORK CONGESTION

BACKGROUND

1. Technical Field

The present invention generally relates to mobile communications and, in particular, to a method and system for adapting the cost of service for a communication network based on the level of network congestion.

2. Background Description

Service providers of communication services typically offer peak and off-peak rates corresponding to peak and non-peak hours, respectively. Peak hours (typically during the day) correspond to time periods when network usage is high and, hence, the cost of service is high. Off-peak hours (typically nights and weekends) correspond to time periods when network usage is generally low and, hence, services often have a lower cost or are sometimes free during these time periods.

A problem with the above designations and practice is that network usage is actually often very high during off-peak hours. That is, since service is cheap or even free during off-peak hours, many users wait until off-peak hours and then make all of their calls at that time. This high network usage can lead to situations such as no dial tone on a cellular network or the user might be forced to switch from digital to analog service.

Accordingly, it would be desirable and highly advantageous to have a method and system for adapting the cost of service for a communication network based on the level of network congestion.

SUMMARY OF THE INVENTION

The problems stated above, as well as other related problems of the prior art, are solved by the present invention, a method and system for adapting the cost of service for a communication network based on the level of network congestion.

The present invention allows a service provider in a communications network (such as a cellular phone system) to adapt the cost of service based on the current network congestion levels. If congestion is high, the cost of communicating on the network goes up; however, if there is little activity on the network, then the cost of communicating on the network drops. The metric for the level of congestion will be communicated back to the user so that the user can adapt his or her usage patterns if necessary (e.g., make more calls when the cost is low).

The present invention provides a benefit to the service provider in that the load over the communication network is spread out, since users are encouraged (via a low cost) to communicate more when the network is free, and they are discouraged (via a high cost) from communicating when the network is congested. Users are not prevented from calling, but rather the feedback (changing cost) is used to control the access habits of the user. The user also benefits in that the user can obtain better rates for service if the user does not mind waiting until the network is not congested.

According to an aspect of the present invention, there is provided a method for providing content to network devices in a communication network. The method includes the step of determining a level of congestion of the communication network. A cost of service is calculated based on the level of congestion. The network devices are informed of the cost of service. A first selection is received from a user of a network device specifying a content to be downloaded to the network device during a download process. A second selection is received from the user specifying a cost of service threshold for the download process. The cost of service is automatically compared to the cost of service threshold. The download process is automatically performed, when the cost of service is less than the cost of service threshold.

These and other aspects, features and advantages of the present invention will become apparent from the following detailed description of preferred embodiments, which is to be read in connection with the accompanying drawings.

DETAILED DESCRIPTION OF PREFERRED EMBODIMENTS

Figure 1:
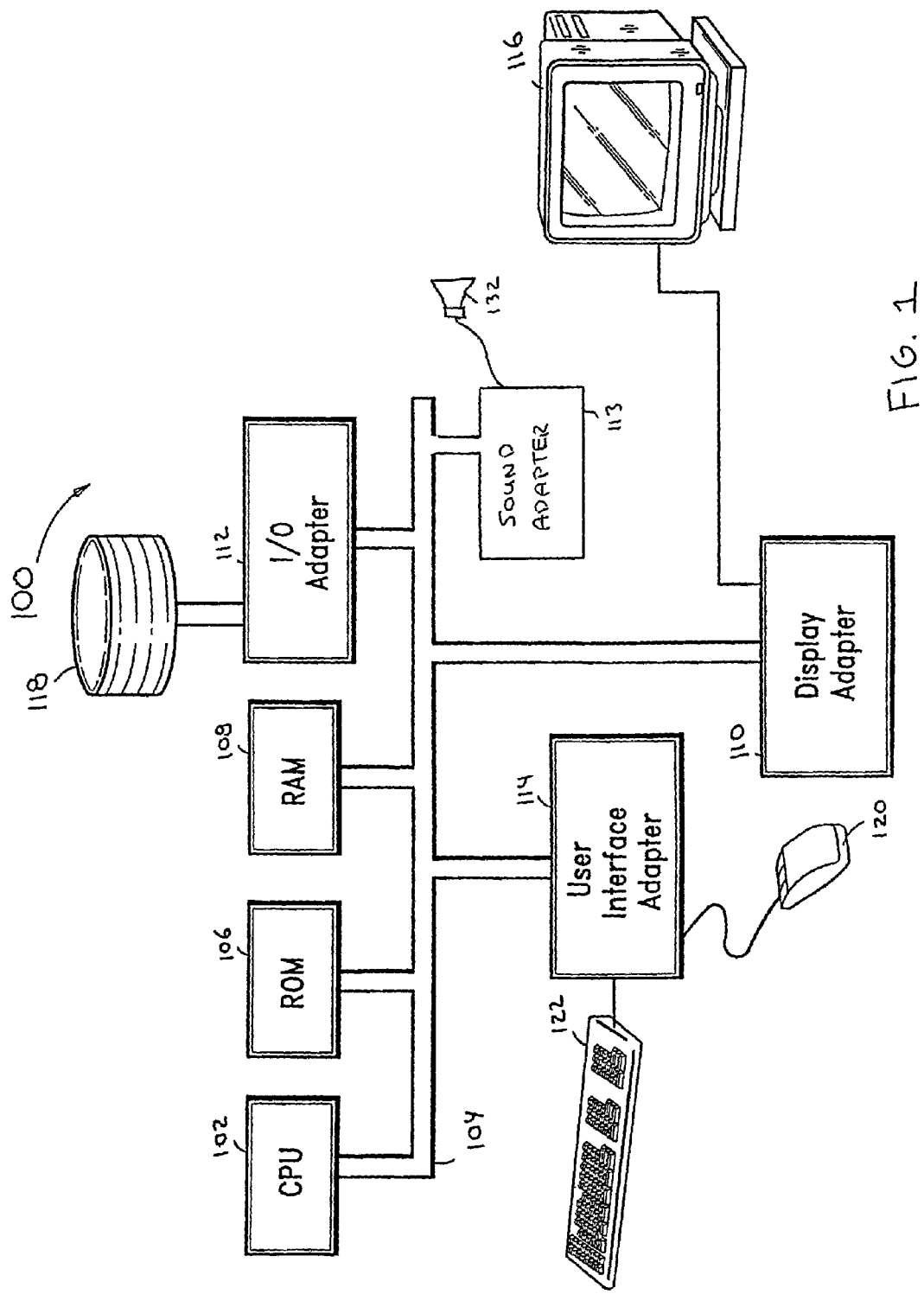
FIG. 1 is a block diagram of a computer processing system 100 to which the present invention may be applied according to an illustrative embodiment thereof.

The present invention is directed to adapting the cost of service for communication networks based on the level of network congestion.

The present invention provides a way to spread out the usage of a communication network by providing the users with feedback (a varying cost) that may be used to regulate their usage. Moreover, since the present invention varies the rates charged based on the network congestion level, the present invention also provides a way for users to pay cheaper prices for service if the users are willing to wait until the network congestion level drops low enough before using the network.

According to one illustrative embodiment of the present invention, the present invention allows a user to have his or her mobile device automatically download content when the cost of service is below a user-selected threshold. The user only selects the cost of service threshold and informs his or her device to download the content. The device then automatically downloads the content (e.g., web pages, e-mail, audio/video files, software, device driver updates, etc.) only during periods of low cost (for example, congestion should be less during very late hours, and the user's device can automatically download information at that time without any user intervention). If the content is very large, it is possible that the device can download it in fragments (e.g., download part of the content during a period of a low cost, then stop downloading when the cost goes up, and finish the download later when the cost drops again).

According to another illustrative embodiment of the present invention, a display on the device displays the current cost of service to the user. This will allow the user to possibly wait to make a call until the cost of service is lower.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying Figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

FIG. 1 is a block diagram of a computer processing system 100 to which the present invention may be applied according to an illustrative embodiment thereof. The computer processing system 100 includes at least one processor (CPU) 102 operatively coupled to other components via a system bus 104. A read only memory (ROM) 106, a random access memory (RAM) 108, a display adapter 110, an I/O adapter 112, a sound adapter 113, and a user interface adapter 114 are operatively coupled to the system bus 104.

A display device 116 is operatively coupled to the system bus 104 by the display adapter 110. A disk storage device (e.g., a magnetic or optical disk storage device) 118 is operatively coupled to the system bus 104 by the I/O adapter 112.

A mouse 120 and keyboard 122 are operatively coupled to the system bus 104 by the user interface adapter 114. The mouse 120 and keyboard 122 may be used to input/output information to/from the computer processing system 100.

A speaker 132 is operatively coupled to the system bus 104 by the sound adapter 113. While the computer processing system 100 is shown in FIG. 1 as including one speaker 132, the present invention is not limited to the same and, thus, more than one speaker (or none) may be included in the computer processing system 100. Moreover, it is to be appreciated that given the teachings of the present invention provided herein, one of ordinary skill in the related art will contemplate various other configurations and implementations of the elements of the present invention, including those shown in FIG. 1, while maintaining the spirit and scope of the present invention.

Figure 2:
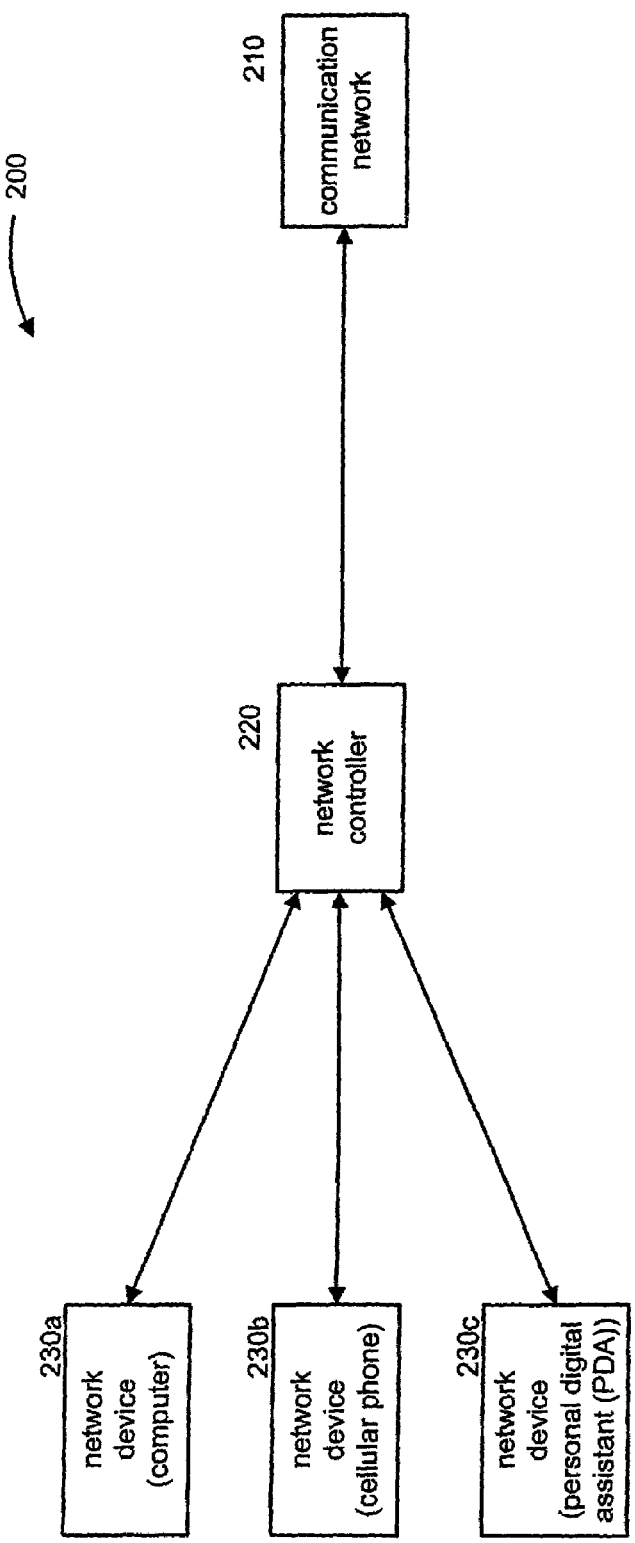
FIG. 2 is a block diagram illustrating a communication system 200 to which the present invention may be applied, according to an illustrative embodiment of the present invention.

FIG. 2 is a block diagram illustrating a communication system 200 to which the present invention may be applied, according to an illustrative embodiment of the present invention. It is to be appreciated that many of the elements of the communication system 200 will have a computer processing system integrated therewith. Such a computer processing system is preferably the same or similar to (having one or more of the same or similar elements) that shown in FIG. 1. However, other variations of a computer processing system may be readily employed by one of ordinary skill in the related art, while maintaining the spirit and scope of the present invention.

The communication system 200 includes a communication network 210, a network controller 220, and network devices 230a–c.

The communication network 210 may include one or more wired networks, one or more wireless networks, or any combination thereof.

The network controller 220 will perform typical network "master" functions, such as controlling access to the network and so forth. In addition, for the purposes of the present invention, the network controller 220 will have hardware/software that will: (a) measure network congestion (using any method, including, but not limited to, number of current users vs. max number of possible supported users, actively used time slots vs. total number of available time slots, and so forth); (b) generate a cost of service for each user that is proportional to the network congestion metric (as network gets more congested, the cost of service increases); and (c) communicate the current cost of service to users in the system via the communications network 210.

In the illustrative embodiment of FIG. 2, the network devices 230a–c are a computer 230a, a cellular phone 230b, and a personal digital assistant 230c. However, it is to be appreciated that the present invention is not limited to the preceding types of network devices and, thus, other types of network devices may also be employed while maintaining the spirit and scope of the present invention. Moreover, the communication system 200 may include more than one of any of the above devices (as well as more than one of any other type of network device).

The network devices 230a–c have the typical functions that any such network device would include. Moreover, for the purposes of this invention, the network devices will have hardware/software that will: (a) receive the current cost of service from the network controller; (b) display or otherwise indicate the current cost of service to the user; and (c) make decisions to perform certain actions based on the cost of service (e.g., perform automatic downloads when cost of service falls below a threshold, notify the user when the cost of service falls below a threshold, and so forth).

Figure 3A:
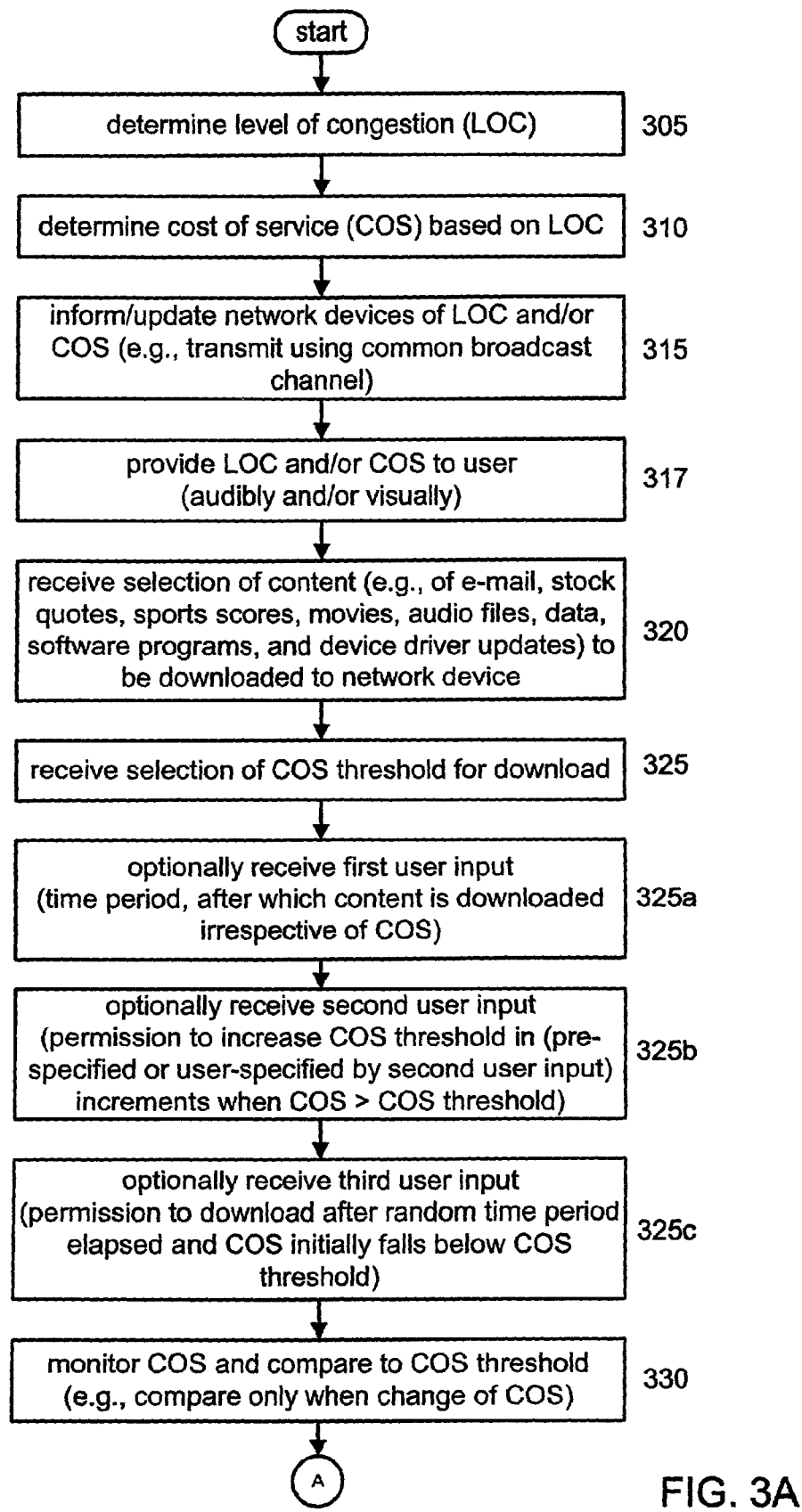
FIGS. 3A and 3B are flow diagrams illustrating a method for adapting a cost of service for a communication network that communicates with at least one network device of at least one user, according to an illustrative embodiment of the present invention.
Figure 3B:
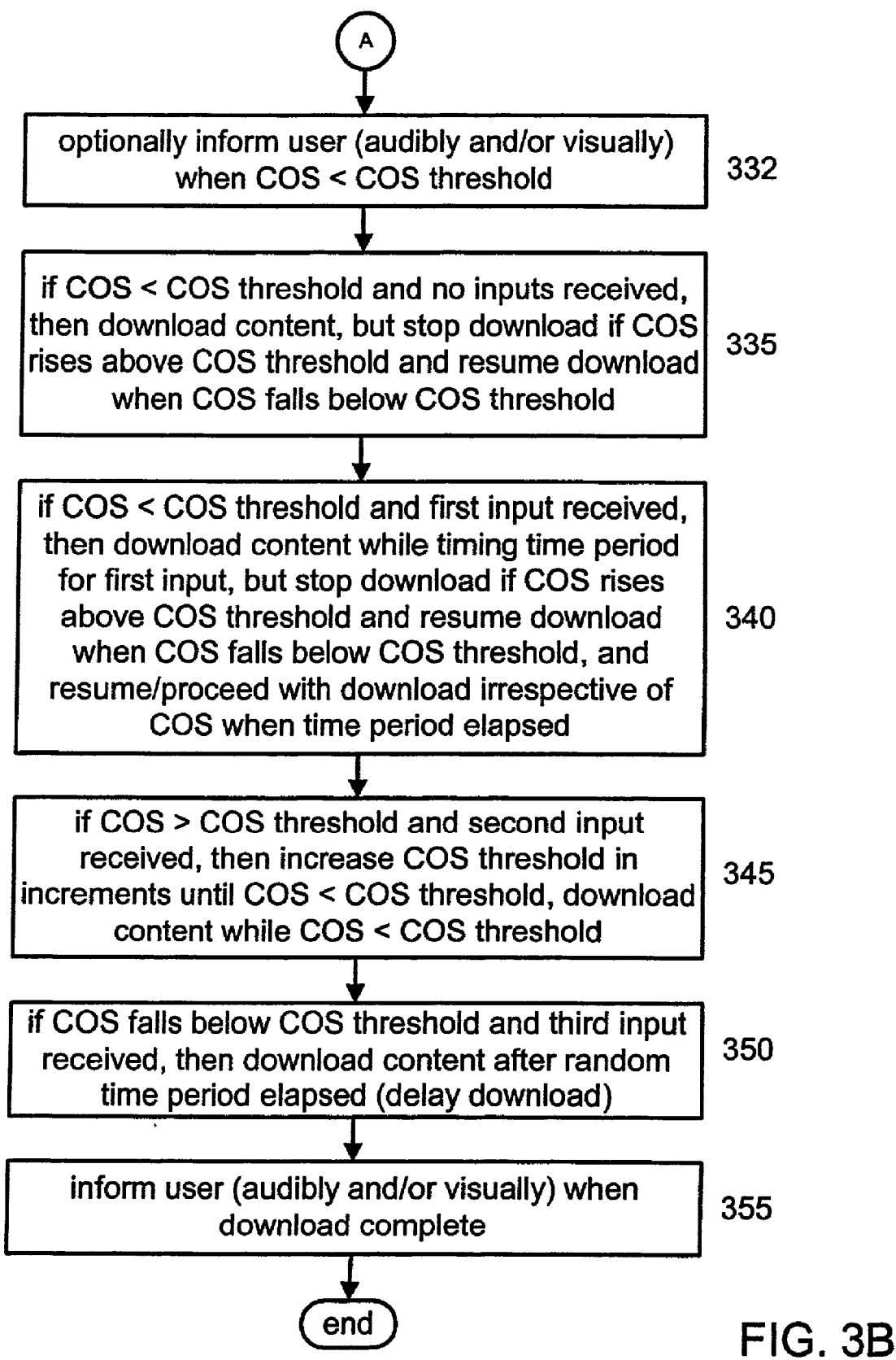

FIGS. 3A and 3B are flow diagrams illustrating a method for adapting a cost of service for a communication network that communicates with at least one network device of at least one user, according to an illustrative embodiment of the present invention.

The level of congestion (also referred to herein as "LOC") of the communication network 200 is determined (step 305). It is to be appreciated that various methods may be used to determine the level of congestion and, thus, the present invention is not limited to any particular method for accomplishing the same. Illustrative methods for computing the level of congestion are further described with respect to FIG. 4 below.

The cost of service (also referred to herein as "COS") is determined based on the level of congestion of the communication network 210 (step 310).

All of the network devices 230 in the communication system 200 are informed of the level of congestion and/or the cost of service (step 315). It is to be appreciated that step 310 may include updating a previous level of congestion and/or a previous cost of service. It is to be further appreciated that various methods can be used to inform the users' devices of the level of congestion and/or the cost of service and, thus, the present invention is not limited to any particular method for accomplishing the same. In a preferred embodiment of the present invention, a broadcast channel is used to inform the network devices 230*a–c* of the level of congestion and/or the cost of service. For example, the $3^{rd}$ Generation (3G) cellular standards cdma2000 and WCDMA both have "common signaling channels" that are used to broadcast information to all devices in a communication system. In the WCDMA standard, a channel called the Broadcast Channel (BCH) is used for broadcasting system information to all devices. For WCDMA devices, the use of the BCH channel would be the preferred method for sending level of congestion and/or cost of service information to the network devices 230*a–c* in the communication system 200.

The level of congestion and/or the cost of service are then provided to the user (step 317). For example, the level of congestion and/or the cost of service may be displayed to the user on a display or may be provided in an audible manner. Current cell phones (and many other types of network devices) have a signal strength indicator represented by a plurality of stacking bars, where the more bars displayed represent more signal power. A similar type of display could inform users of the congestion level and/or cost of service (although only one needs to be indicated since they are proportional to each other).

A selection is received from the user of any one of the network devices 230*a–c* of content to be downloaded to his or her network device (step 320). Examples of this content include e-mail, stock quotes, sports scores, movies, audio files, data, software programs, device driver updates for the mobile device itself, and so forth. It is to be appreciated that various other types of content may also be downloaded and, thus, the present invention is not limited to any particular content.

Another selection is received from the user of a cost of service threshold (also referred to herein as "COS threshold") for the download (step 325). Step 325 may optionally include the steps of receiving a first user input (step 325*a*), receiving a second user input (step 325*b*), and/or receiving a third user input (step 325*c*).

The first user input is a time period to be set on a timer. If the download is not completed by the time the time period expires, the network device will complete the download irrespective of the (current) cost of service. This feature would allow the user to set a time boundary that defines how long it would be before the network device starts downloading the content (for example, if the user's cost of service threshold is too low, a long time may pass before the cost of service actually gets down to that level).

The second user input is a permission to gradually increase the cost of service threshold in increments if the network device is unable to complete the download at the current setting of the cost of service threshold. The increments may be pre-specified or may by specified by the user as part of the second user input. Thus, the user's network device can slowly increase the cost of service threshold over time if the network device is unable to complete the download at the current setting of the cost of service threshold. Again, this prevents the download from taking too long when the user sets a threshold that is too low.

The third user input is a permission to begin downloading after a random amount of time has elapsed from when the cost of service is below a predefined cost of service threshold. Thus, the network device will not immediately begin downloading the data when the cost of service falls below the threshold. Instead, the network device will wait a random amount of time, and if the cost of service is still below the threshold, then it will begin the download. This "random back-off" process will prevent large numbers of devices from simultaneously beginning downloads when the cost of service changes, and thus creating a sudden increase in network congestion.

It is to be appreciated that after step 325, no other user intervention is required to complete the download as the device handles everything automatically.

The network device of the user automatically monitors the cost of service and compares the cost of service to the user-selected cost of service threshold (step 330). Preferably, the network performs the compare operation only when there is a change in the cost of service.

The network device may optionally inform the user when the cost of service is below the threshold (step 332), so that the user could make his or her phone calls or engage in other activities while the cost of service is low. The user may be informed audibly and/or visually.

If the current cost of service is below the threshold, and none of the first, second, or third user inputs have been received, then the network device automatically downloads the content (step 335). Step 335 may include the steps of stopping the downloading process if the cost of service rises above threshold and resuming the downloading process when the cost of service falls below the threshold.

If the cost of service is below the threshold, and the first user input has been received, then the network device starts downloading the content while timing the time period corresponding to the first user input (step 340). Step 340 may include the steps of stopping the downloading process if the cost of service rises above the threshold, resuming the downloading process when cost of service falls below the threshold, and resuming/proceeding with the downloading process irrespective of the cost of service when the time period corresponding to the first user input has elapsed.

If the cost of service is above the threshold and the second input has been received, then the threshold is gradually increased in (user-specified or pre-specified) increments by the network device until the cost of service is less than the threshold at which time the content is downloaded (step 345).

If the cost of service is above the threshold and the third input has been received, then the content is downloaded after a random time period has elapsed, the random time period beginning when the current cost of service initially falls below the cost of service threshold (i.e., when the downloading process commences) (step 350).

When the download is complete the device can notify the user (step 355). Such notification may be provided audibly and/or visually.

Figure 4:
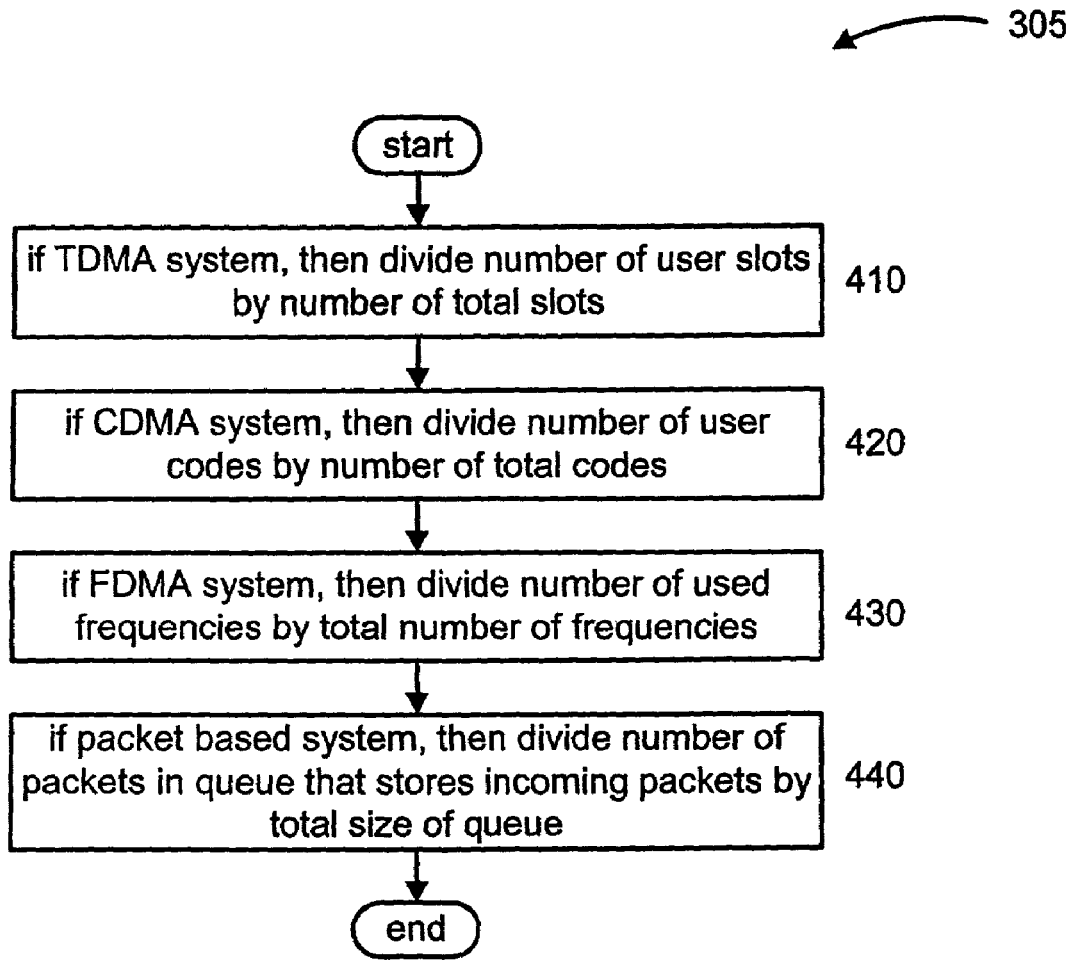
FIG. 4 is a flow diagram illustrating a plurality of methods for determining network congestion, according to various illustrative embodiments of the present invention.

FIG. 4 is a flow diagram illustrating a plurality of methods for determining network congestion, according to various illustrative embodiments of the present invention. That is, FIG. 4 further illustrates various approaches that may be used for step 305 of FIG. 3.

If the communication system 200 is based on Time Division Multiple Access (TDMA), then time is divided up into slots and each user is assigned a periodic time slot during which time the user can transmit. Congestion in such a system could be measured as the number of used slots divided by the number of total slots in the system (step 410).

In a Code Division Multiple Access (CDMA) system (used for cellular applications, as well as others), each user is assigned a unique spreading code and only a limited number of codes are available. Congestion would be measured as the number of used codes divided by the number of total codes in the system (step 420).

In a Frequency Division Multiple Access (FDMA) system, different users are assigned different frequencies to communicate on. Congestion in this system would be measured as the number of used frequencies divided by the total number of frequencies in the system (step 430).

In a packet-based system, the network controller (e.g., a base station in a cellular network) would have a queue that would be used to store incoming packets. If congestion started to increase, the number of packets in the queue would increase because they are coming in faster than they are being processed. Congestion in this system could be measured as the number of packets in the queue divided by the total size of the queue (step 440).

The preceding methods for determining network congestion are meant as examples and other methods can be used while maintaining the spirit and scope of the present invention. That is, the present invention is not dependent upon any particular method for determining network congestion or for determining pricing based on the network congestion (it is assumed that the cost of service will increase as the network congestion increases).

One of the many advantages of the present invention is that a user can download information more cheaply if the user does not require the information immediately. For example, perhaps the user wants to have a certain software program or movie or sound file on his or her network device. The user does not want it immediately, but the user would like to have it within the next few days. So the user puts in the request and sets the threshold to a low cost of service. The cost of service might drop very low late at night when network usage is low, and the device can automatically download the data at this time. The user wakes up in the morning and finds the content already downloaded on his or her network device. Moreover, the network device can also display the current cost of service (or perhaps a series of bars similar to the currently used power strength indicators). The user, if he or she so desires, can look at the bars to see what the current cost of service would be for service.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A method for providing content to network devices in a communication network, the method comprising the steps of:
   determining a level of congestion of the communication network;
   calculating a cost of service based on the level of congestion;
   informing the network devices of the cost of service;
   receiving a first selection from a user of a network device specifying a content to be downloaded to the network device during a download process;
   receiving a second selection from the user specifying a cost of service threshold for the download process;
   automatically comparing the cost of service to the cost of service threshold;
   automatically performing the download process, when the cost of service is less than the cost of service threshold, wherein said performing step comprises the steps of:
   stopping the download process, when the cost of service rises above the cost of service threshold; and
   resuming the download process, when the cost of service falls below the cost of service threshold.

2. The method of claim 1, further comprising the steps of:
   receiving a first user input corresponding to a time period after which the network device will complete the download process irrespective of the cost of service if the download process is not yet completed;
   timing the time period upon a start of said performing step, when the first user input has been received; and
   proceeding with the download process irrespective of the cost of service, when the time period has elapsed.

3. The method of claim 1, further comprising the steps of:
   receiving a second user input corresponding to a permission to gradually increase the cost of service threshold in increments if the cost of service is above the cost of service threshold;
   gradually increasing the cost of service threshold in increments until the cost of service is less than the cost of service threshold, when the cost of service is above the cost of service threshold and the second input has been received.

4. The method of claim 3, wherein the increments are user-specified or pre-specified.

5. The method of claim 3, wherein the second user input specifies the increments.

6. The method of claim 1, further comprising the steps of:
   receiving a third user input corresponding to a permission to begin the download process only after a random amount of time has elapsed from when the cost of service initially falls below the cost of service threshold; and
   delaying a start of said performing step until the random amount of time has expired, when the cost of service initially falls below the cost of service threshold and the third input has been received.

7. The method of claim 1, further comprising the step of notifying the user when the download process is complete.

8. The method of claim 1, wherein said informing step comprises the step of updating a previous cost of service.

9. The method of claim 1, wherein said informing step comprises the step of transmitting the cost of service to the network devices using a broadcast channel common to all of the network devices.

10. The method of claim 1, wherein said informing step comprises the step of informing the network devices of the level of congestion.

11. The method of claim 10, wherein said informing step comprises the step of updating a previous level of congestion.

12. The method of claim 10, wherein said informing step comprises the step of transmitting the level of congestion to the network devices using a broadcast channel common to the network devices.

13. The method of claim 1, wherein the content comprises at least one of e-mail, stock quotes, sports scores, movies, audio files, data, software programs, and device driver updates.

14. The method of claim 1, wherein said comparing step comprises the step of automatically monitoring the cost of service, and said comparing step compares the cost of service to the cost of service threshold only when there is a change of the cost of service.

15. The method of claim 1, further comprising the step of automatically notifying the user when the cost of service is below the cost of service threshold.

16. The method of claim 1, further comprising the step of providing at least one of the level of congestion and the cost of service to users of the network devices.

17. The method of claim 16, wherein said providing step comprises the step of displaying at least one of the level of congestion and the cost of service to users of the network devices.

18. The method of claim 16, wherein said providing step comprises the step of audibly outputting at least one of the level of congestion and the cost of service to users of the network devices.

19. The method of claim 16, wherein said providing step comprises the step of displaying at least one of the level of congestion and the cost of service to users of the network devices using a series of stacking bars, such that increases in the level of congestion and/or the cost of service result in an increase in a number of displayed bars.

20. The method of claim 1, wherein the communication system is a Time Division Multiple Access (TDMA) system, and said determining step comprises the step of dividing a number of used slots by a number of total slots.

21. The method of claim 1, wherein the communication system is a Code Division Multiple Access (CDMA) system, and said determining step comprises the step of dividing a number of used codes by a number of total codes.

22. The method of claim 1, wherein the communication system is a Frequency Division Multiple Access (FDMA) system, and said determining step comprises the step of dividing a number of used frequencies by a total number of frequencies.

23. The method of claim 1, wherein the communication system is packet based, and said determining step comprises the step of dividing a number of packets in a queue that stores incoming packets by a total size of the queue.

24. A communication system, comprising:
a communication network;
a network controller for controlling access to the communication network, determining a level of congestion of the communication network, calculating a cost of service based on the level of congestion; and
a plurality of network devices, each of the plurality of network devices for accessing the communication network, receiving the cost of service from the network controller, receiving from a corresponding user of each of the plurality of network devices, respectively, a first selection specifying a content to be downloaded during a download process, receiving a second selection from the corresponding user specifying a cost of service threshold for the download process, automatically comparing the cost of service to the cost of service threshold, and automatically performing the download process when the cost of service is less than the cost of service threshold, wherein each of the plurality of network devices stops the download process when the cost of service rises above the cost of service threshold, and resumes the download process when cost of service falls below the cost of service threshold.

25. The communication system of claim 24, wherein each of the plurality of network devices has a capability of receiving a first user input corresponding to a time period after which the download process will be completed irrespective of the cost of service if the download process is not yet completed, timing the time period upon a start of the download process when the first user input has been received, and proceeding with the download process irrespective of the cost of service when the time period has elapsed.

26. The communication system of claim 24, wherein each of the plurality of network devices has a capability of receiving a second user input corresponding to a permission to gradually increase the cost of service threshold in increments when the cost of service is above the cost of service threshold, and gradually increasing the cost of service threshold in increments until the cost of service is less than the cost of service threshold when the second input has been received and the cost of service is above the cost of service threshold.

27. The communication system of claim 24, wherein each of the plurality of network devices has a capability of receiving a third user input corresponding to a permission to begin the download process only after a random amount of time has elapsed from when the cost of service initially falls below the cost of service threshold, and delaying a start of the download process until the random amount of time has expired when the third input has been received and the cost of service initially falls below the cost of service threshold.

28. The communication system of claim 24, wherein each of the plurality of network devices notifies the corresponding user when the download process is complete.

29. The communication system of claim 24, wherein the network controller transmits the cost of service to each of the plurality of network devices Lising a broadcast channel common to all of the plurality of network devices.

30. The communication system of claim 24, wherein the network controller informs each of the plurality of network devices of the level of congestion.

31. The communication system of claim 30, wherein the network controller transmits the level of congestion to each of the plurality of network devices using a broadcast channel common to all of the plurality of network devices.

32. The communication system of claim 24, wherein the content comprises at least one of e-mail, stock quotes, sports scores, movies, audio files, data, software programs, and device driver updates.

33. The communication system of claim 24, wherein each of the plurality of network devices automatically monitors the cost of service, and automatically compares the cost of service to the cost of service threshold only when there is a change of the cost of service.

34. The communication system of claim 24, wherein each of the plurality of network devices automatically notifies the user when the cost of service is below the cost of service threshold.

35. The communication system of claim 24, wherein each of the plurality of network devices further provides at least one of the level of congestion and the cost of service to the corresponding user, respectively.

36. The communication system of claim 35, wherein each of the plurality of network devices displays at least one of the level of congestion and the cost of service to the corresponding user, respectively.

37. The communication system of claim 35, wherein each of the plurality of network devices audibly outputs at least one of the level of congestion and the cost of service to the corresponding user, respectively.

38. The communication system of claim 35, wherein each of the plurality of network devices displays at least one of the level of congestion and the cost of service to the corresponding user, respectively, using a series of stacking bars, such that increases in the level of congestion and/or the cost of service result in an increase in a number of displayed bars.

39. The communication system of claim 24, wherein the communication system is a Time Division Multiple Access (TDMA) system, and the network controller determines the level of congestion by dividing a number of used slots by a number of total slots.

40. The communication system of claim 24, wherein the communication system is a Code Division Multiple Access (CDMA) system, and the network controller determines the level of congestion by dividing a number of used codes by a number of total codes.

41. The communication system of claim 24, wherein the communication system is a Frequency Division Multiple Access (FDMA) system, and the network controller determines the level of congestion by dividing a number of used frequencies by a total number of frequencies.

42. The communication system of claim 24, wherein the communication system is packet based, and the network controller determines the level of congestion by dividing a number of packets in a queue that stores incoming packets by a total size of the queue.

43. The method of claim 1, further comprising the step of providing the ability to receive and process any one of a first user input, a second user input and a third user input.

* * * * *